(12) United States Patent
Shono

(10) Patent No.: US 6,825,882 B1
(45) Date of Patent: Nov. 30, 2004

(54) DIGITAL SINGLE LENS REFLEX CAMERA

(75) Inventor: Tetsuji Shono, Saitama (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 09/435,817

(22) Filed: Nov. 8, 1999

(30) Foreign Application Priority Data

Nov. 13, 1998 (JP) ............................................. 10-323213
Nov. 13, 1998 (JP) ............................................. 10-323214

(51) Int. Cl.$^7$ ............................................. H04N 5/225
(52) U.S. Cl. ...................... 348/341; 396/385; 396/386; 396/354
(58) Field of Search ...................... 348/333.01, 333.08, 348/333.09, 341, 335; 359/363; 396/354, 373, 384, 385, 386, 447

(56) References Cited

U.S. PATENT DOCUMENTS

| | | | | |
|---|---|---|---|---|
| 3,972,056 A | * | 7/1976 | Tsujimoto et al. | ............ 396/80 |
| 4,119,982 A | * | 10/1978 | Imura et al. | ................ 396/354 |
| 4,291,945 A | * | 9/1981 | Hayamizu | ................... 396/384 |
| 4,609,272 A | * | 9/1986 | Yokota et al. | .............. 396/384 |
| 5,706,051 A | | 1/1998 | Mogamiya | |
| 5,778,270 A | | 7/1998 | Morisawa | |
| 5,893,653 A | | 4/1999 | Abe | |
| 5,933,670 A | * | 8/1999 | Cama et al. | ................ 396/429 |
| 6,005,712 A | * | 12/1999 | Hayashi et al. | ............. 396/286 |
| 6,130,714 A | * | 10/2000 | Abe et al. | .................... 348/335 |
| 6,466,743 B2 | * | 10/2002 | Nakagishi et al. | .......... 396/384 |
| 6,584,282 B2 | * | 6/2003 | Saito | ........................... 396/97 |
| 6,633,337 B1 | * | 10/2003 | Togino | .................. 348/333.08 |

* cited by examiner

Primary Examiner—Wendy R. Garber
Assistant Examiner—Jacqueline Wilson
(74) Attorney, Agent, or Firm—Greenblum & Bernstein, P.L.C.

(57) ABSTRACT

A digital single lens reflex camera includes a reflector located in a photographic light path to reflect object-carrying light transmitted through a photographic optical system toward a finder optical system. An image pickup device is located at the imaging plane of the photographic optical system. The object-carrying light in the photographic light path is reflected by the reflector in a direction substantially away from an eyepiece optical system of the finder optical system. A reflection light path is formed in the vicinity of the photographic optical system and is provided with a plurality of reflection surfaces to make the light reflected by the reflector in the photographic light path incident on the eyepiece optical system. Furthermore, a relay optical system is located in the reflection light path to relay an image formed on a primary imaging plane, which is optically equivalent to an image pickup surface of the image pickup device, to the eyepiece optical system.

16 Claims, 5 Drawing Sheets

DIGITAL SINGLE LENS REFLEX CAMERA

BACKGROUND OF THE INVENTION

1. Field of the Invention

The present invention relates to a digital single lens reflex camera, and in particular, relates to an arrangement of an image pickup device, a rigid substrate and a finder optical system therein.

2. Description of the Related Art

In a known digital single lens reflex camera which has a reflector in a photographic light path to reflect object-carrying light transmitted through a photographic optical system toward a finder optical system, an image pickup device is provided at the imaging plane of the photographic optical system.

The reflector placed in the photographic light path can be, for example, a quick return mirror, a quick return half mirror, or a stationary half mirror (beam splitter or semitransparent element). One of the most significant differences between a digital still single lens reflex camera and a single lens reflex camera, using a Leica sized (35 mm) silver-halide film for example, is that the image pickup surface of the image pickup device is considerably smaller than a picture surface of the silver-halide film camera.

In a camera using a small image pickup device, since an image is formed on the small image pickup surface, the photographic optical system can be made accordingly small. However, in a digital single lens reflex camera, if the photographic optical system is considerably smaller, it is difficult to construct the finder optical system. Namely, if the light transmitted through the photographic optical system is merely split to make it incident on the finder optical system, where a primary imaging plane is formed at a position (focusing plate) optically equivalent to the image pickup device, the size of the primary imaging plane is identical to the size of the image pickup surface of the image pickup device. However, it is difficult to view the image of the small primary imaging plane as an orthoscopic erect image through a finder optical system of a conventional single lens reflex camera. To solve this problem, it is necessary to provide a relay optical system which enlarges the image of the primary imaging plane and forms an image on a second imaging plane. However, the relay optical system must be provided with a plurality of lens elements, in order to achieve a high quality image.

However, in a finder optical system of a conventional single lens reflex camera, the reflection direction of the object-carrying light reflected by the reflector located in the photographic light path is determined so that the object-carrying light is oriented substantially toward an eyepiece optical system of the finder optical system. Namely, the finder light path between the reflector and the eyepiece optical system is set to a minimum. Consequently, it is difficult to provide a large space for accommodating the relay optical system. In other words, the camera size is increased to accommodate the relay optical system.

Moreover, since a conventional digital single lens reflex camera has basically the same structure as a conventional silver halide film type camera, the structure is complex due to the assembling operation being similar to that of a silver halide film type camera. However, neither a mechanical shutter nor a film feed mechanism are necessary in a digital single lens reflex camera. Furthermore, if the mirror in the photographic light path is made of a semitransparent member, a mirror drive mechanism is not necessary, simplifying the structure of a digital single lens reflex camera.

SUMMARY OF THE INVENTION

A first object of the present invention is to provide a digital single lens reflex camera having a reflector located in the photographic light path, to facilitate the arrangement of a relay optical system which is adapted to relay an image on a focusing plate to an eyepiece optical system.

A second object of the present invention is to provide a simple digital single lens reflex camera having no movable members, which can be easily assembled.

To achieve the objects mentioned above and according to an aspect of the present invention, a digital single lens reflex camera includes a reflector located in a photographic light path to reflect object-carrying light transmitted through a photographic optical system toward a finder optical system, where an image pickup device is located at the imaging plane of the photographic optical system. The object-carrying light in the photographic light path is reflected by the reflector in a direction substantially away from an eyepiece optical system of the finder optical system. A reflection light path is formed in the vicinity of the photographic optical system and is provided with a plurality of reflection surfaces to make the light reflected by the reflector in the photographic light path incident upon the eyepiece optical system. Furthermore, a relay optical system is disposed in the reflection light path to relay an image formed on a primary imaging plane, which is optically equivalent to an image pickup surface of the image pickup device, to the eyepiece optical system.

Preferably, the relay optical system constitutes an image magnifying optical system which enlarges and re-forms the image formed on the primary imaging plane which is optically equivalent to the image pickup surface of the image pickup device.

Preferably, the reflector includes a beam splitter which partly reflects object-carrying light transmitted through the photographic optical system toward the finder optical system and transmits the remainder of the object-carrying light toward the image pickup device.

According to another aspect of the present invention, a digital single lens reflex camera is provided. The camera includes a photographic optical system; a finder optical system having an eyepiece optical system; and a reflector provided in a photographic light path to reflect object-carrying light transmitted through the photographic optical system toward the finder optical system. The reflector is arranged to reflect the object-carrying light in a direction substantially opposite to a direction of the position of the eyepiece optical system with respect to an optical axis of the photographic optical system. An image pickup device is located at an imaging plane of the photographic optical system and a reflection light path is provided with a plurality of reflection surfaces. The reflection light path being formed in the vicinity of the photographic optical system makes the light reflected by the reflector in the photographic light path incident on the eyepiece optical system. A relay optical system that is disposed in the reflection light path relays an image formed on a primary imaging plane, which is optically equivalent to an image pickup surface of the image pickup device, to the eyepiece optical system.

According to another aspect of the present invention, a digital single lens reflex camera is provided having a semi-transparent member which reflects a portion of object-carrying light transmitted through a photographic optical system and permits the remainder of the object-carrying light to pass therethrough toward an image pickup device. At least one rigid substrate lies in a plane substantially perpendicular to the optical axis of the photographic optical system. At least the image pickup device is mounted thereon, and an eyepiece optical system with the optical axis thereof being substantially parallel with the optical axis of the photographic optical system. The eyepiece optical system is provided on one side of at least one rigid substrate. The semitransparent member partly reflects the object-carrying light transmitted through the photographic optical system in a direction substantially away from the eyepiece optical system. A plurality of reflection surfaces reflect the light reflected by the semitransparent member toward the eyepiece optical system. A relay optical system is disposed in a reflection light path between the semitransparent member and the eyepiece optical system to relay an image, formed on a primary imaging plane which is optically equivalent to an image pickup surface of the image pickup device, to an eyepiece optical system; are integrally formed as a finder block. The finder block is provided on the surface of the rigid substrate which is adjacent to the photographic optical system.

Preferably, the rigid substrate is provided with a first substrate on which the image pickup device is mounted and at least another substrate superimposed thereon.

Preferably, the relay optical system constitutes an image magnifying optical system which enlarges and re-forms the image formed on the primary imaging plane which is optically equivalent to the image pickup surface of the image pickup device.

Preferably, the finder block is integrally provided with the eyepiece optical system of the finder optical system and is provided in the upper portion of the rigid substrate.

According to another aspect of the present invention, a digital single lens reflex camera is provided including a photographic optical system, a finder optical system having an eyepiece optical system and an image pickup device located at an imaging plane of the photographic optical system. A semitransparent member which reflects a portion of object-carrying light transmitted through the photographic optical system and permits the remainder of the object-carrying light to pass therethrough toward the image pickup device. The semitransparent member is arranged to reflect the object-carrying light in a substantially opposite direction with respect to the position of the eyepiece optical system and with respect to the optical axis of the photographic optical system. A reflection light path is provided with a plurality of reflection surfaces, the reflection light path being formed in the vicinity of the photographic optical system to make the light reflected by the reflector in the photographic light path incident on the eyepiece optical system. A relay optical system that is disposed in the reflection light path to relay an image formed on a primary imaging plane that is optically equivalent to an image pickup surface of the image pickup device to the eyepiece optical system. At least one rigid substrate on which at least the image pickup device is mounted, with the rigid plate lying in a plane substantially perpendicular to the optical axis of the photographic optical system. A finder block that integrally forms the semitransparent member, a plurality of the reflection surfaces and the relay optical system. The finder block being disposed on the surface of the rigid substrate located adjacent to the photographic optical system.

Preferably, the eyepiece optical system is arranged so that an optical axis thereof is substantially parallel with the optical axis of the photographic optical system and is provided on one side of the rigid substrate.

Preferably, the plurality of reflection surfaces, described in each above-mentioned aspect of the present invention, includes at least one of a penta prism, a penta roof-prism, and a mirror.

The present disclosure relates to subject matter contained in Japanese Patent Application No. 10-323213 (filed on Nov. 13, 1998) and Japanese Patent Application No. 10-323214 (filed on Nov. 13, 1998) which are expressly incorporated herein by reference in their entireties.

BRIEF DESCRIPTION OF THE DRAWINGS

The invention will be discussed below in detail, with reference to the accompanying drawings, in which.

DESCRIPTION OF THE PREFERRED EMBODIMENT

Figure 1:
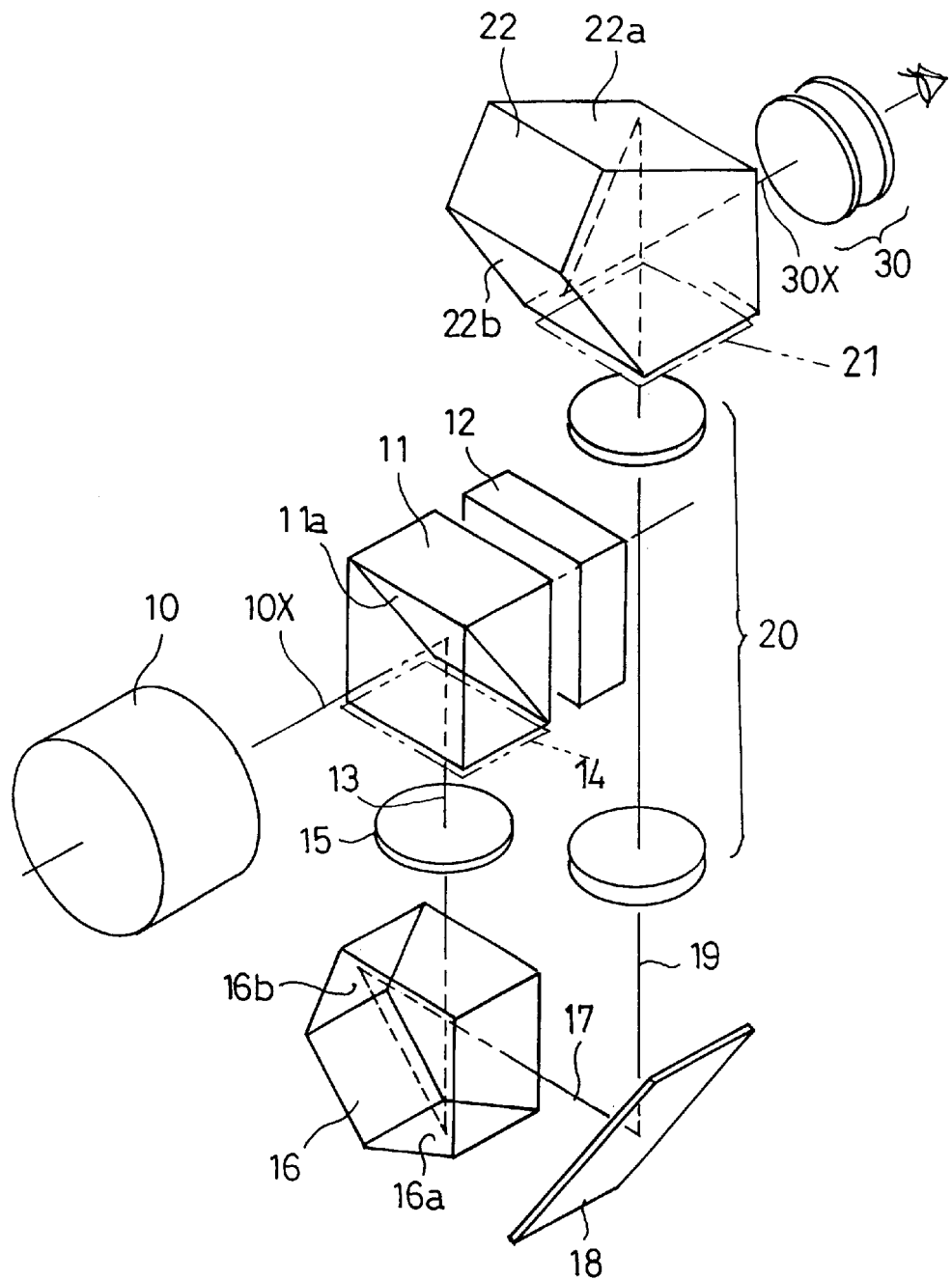
FIG. 1 s a perspective view of a first embodiment of a single lens reflex digital still camera according to the present invention.
Figure 2:
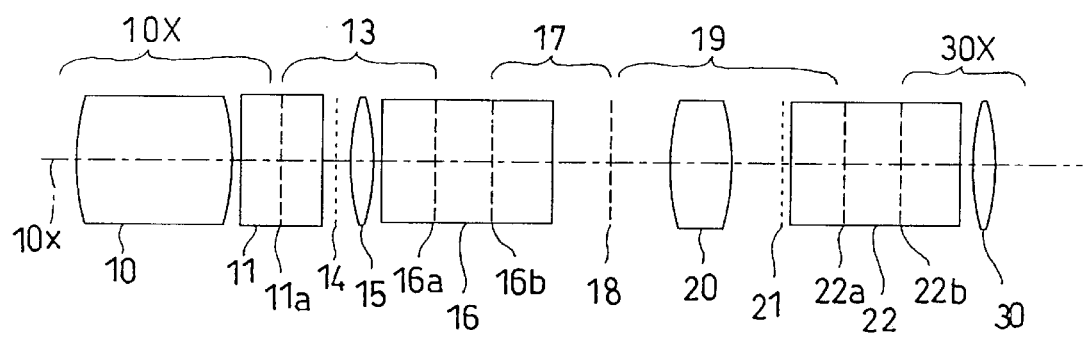
FIG. 2 is a developed view of optical elements located between a reflector placed in a photographic light path and an eyepiece optical system, in a camera shown in FIGS. 1 and 5.

FIGS. 1 and 2 show a first embodiment of a digital still single lens reflex camera of the present invention. In the first embodiment, the reflector placed in the photographic light path is in the form of a stationary beam splitter (stationary half mirror). Object-carrying light transmitted through a photographic optical system 10 is made incident on the beam splitter (half mirror) 11 secured at a view position in the photographic light path. The light transmitted through a beam splitting surface (semitransparent surface) 11a of the beam splitter 11 is received by an image pickup device 12 which is placed at an imaging plane (focal plane) of the photographic optical system 10. The photographic optical system 10 converges and forms an object image directly on an image pickup surface of the image pickup device 12.

The eyepiece optical system 30 is located above the photographic optical system 10. The beam splitting surface 11a of the beam splitter 11 is set so that the light path (optical axis) 13 of the object-carrying light reflected by the beam splitting surface 11a extends downwardly in a direction substantially away from an eyepiece optical system 30, unlike conventional single lens reflex cameras.

A primary imaging plane 14 which is optically equivalent to the image pickup surface of the image pickup device 12 is located on the light path of the reflected light (reflection light path) 13. A condenser lens 15 is located in the vicinity of and behind the primary imaging plane 14. A pentagonal prism 16 having two reflection surfaces 16a and 16b defining a 45 degree angle therebetween is provided below the beam splitter 11 as a lower reflector to deflect the reflection light path 13 in the lateral direction by 90 degrees. A reflector 18 is provided on one side of the pentagonal prism 16, as a lower reflector to deflect upward the lateral reflection light path 17 by 90 degrees at an approximately vertical direction. The relay optical system 20 is placed in the vertical reflection light path 19 produced by bending the light path by the reflector 18. A pentagonal prism 22 is provided as an upper reflector between the vertical reflection light path 19 and the optical axis 30X of the eyepiece optical system 30. The pentagonal prism 22 has two reflection surfaces 22a and 22b which form therebetween a 45 degree angle, and accordingly bends the vertical reflection light path 19 by 90 degrees to make the same coincidental with the optical axis 30X of the eyepiece optical system 30.

According to the above-mentioned structure, the object-carrying light is reflected downward by the beam splitting surface 11a of the beam splitter 11 (toward one side of the beam splitter substantially opposite to the side on which the eyepiece optical system 30 is provided) and the reflection light path along which the reflected light travels toward the eyepiece optical system 30 is located within a plane perpendicular to the optical axis 10X of the photographic optical system 10 and in the vicinity thereof. Accordingly, a space large enough to accommodate the relay optical system 20 can be easily achieved. Namely, if the number of lens elements of the relay optical system 20 is increased to enhance the image formation property, the increased number of lens elements can be easily accommodated.

Note that the object image formed on the primary imaging plane 14 which is optically equivalent to the image pickup surface of the image pickup device 12 is appropriately enlarged and is re-formed as a secondary image on the secondary imaging plane 21 by the relay optical system 20, so that the secondary image can be viewed through the eyepiece optical system 30. Namely, the relay optical system 20 and the eyepiece optical system 30 constitute an image magnifying optical system. There are six reflection surfaces including the beam splitting surface 11a of the beam splitter 11, which are appropriately oriented, in the light path from the photographic optical system 10 to the eyepiece optical system 30 to form an erect image to be viewed through the eyepiece optical system 30. In an embodiment illustrated in FIG. 1, the reflection surfaces 16a and 16b of the pentagonal prism 16 can be replaced with mirrors.

Figure 4:
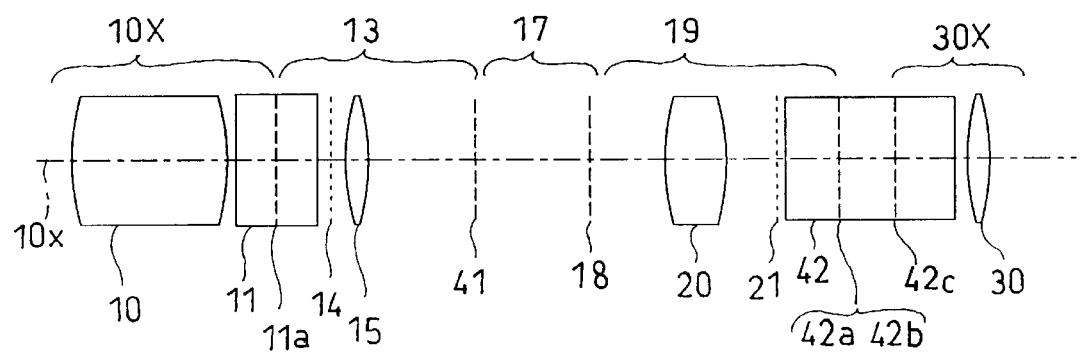
FIG. 4 is a developed view of optical elements provided between a reflector placed in a photographic light path and an eyepiece optical system, in a camera shown in FIGS. 3 and 6.
Figure 3:
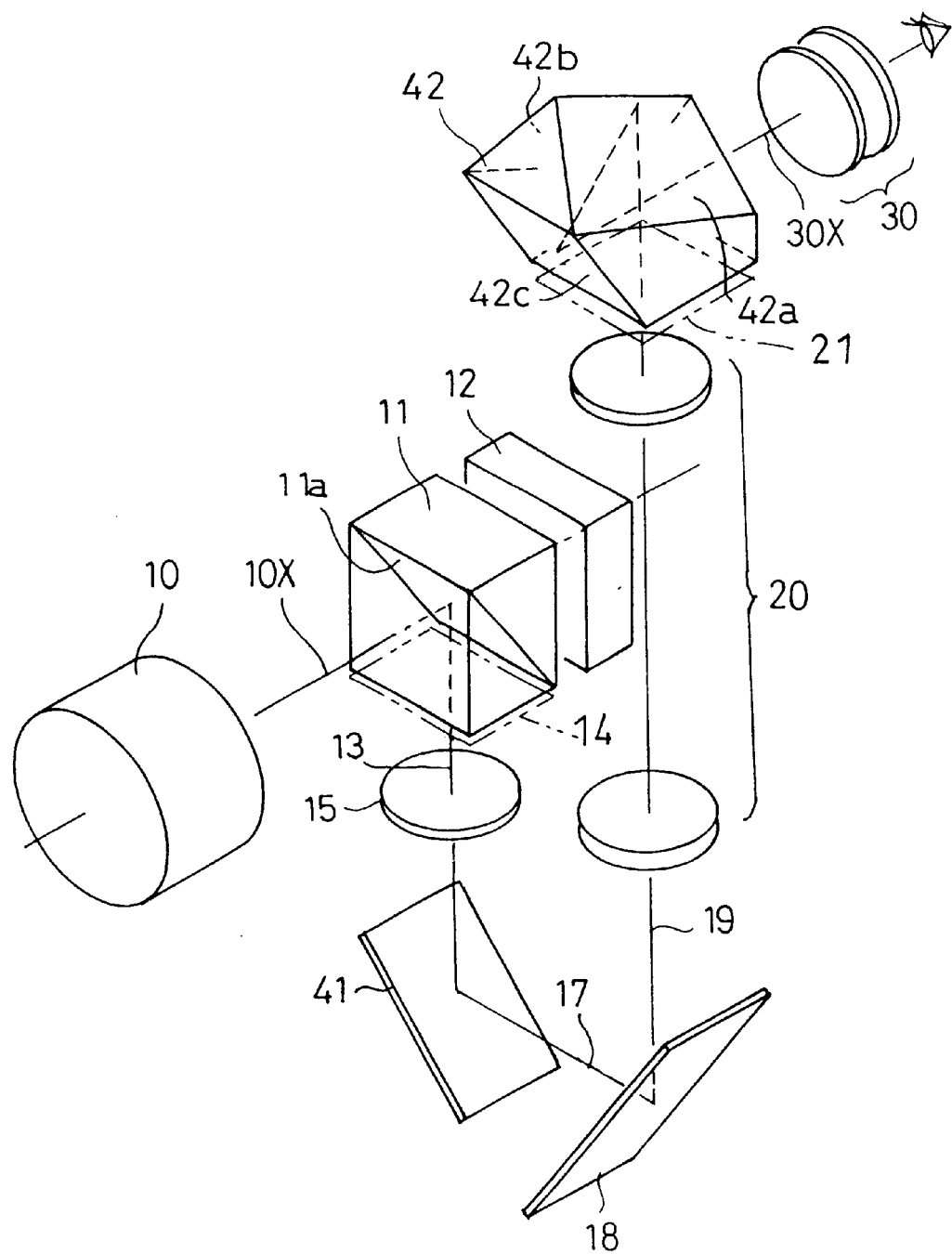
FIG. 3 is a perspective view of a second embodiment of a single lens reflex digital still camera according to the present invention.

FIGS. 3 and 4 show a second embodiment of the present invention. In the second embodiment, the pentagonal prisms 16 and 22 in the first embodiment are replaced with a mirror 41 and a pentagonal roof prism 42, respectively. The pentagonal roof prism 42 is provided with a pair of orthogonal roof reflection surfaces 42a and 42b, and a third reflection surface 42c which forms a 45 degree angle with respect to edge line of the roof reflection surfaces 42a and 42b. In the second embodiment, six reflection surfaces are also provided in the light path from the photographic optical system 10 to the eyepiece optical system 30 to form an erect image to be viewed through the eyepiece optical system 30.

Similar to the first embodiment, in the second embodiment, the object image formed on the primary imaging plane 14 is enlarged and re-formed on the secondary imaging plane 21 by the relay optical system 20, so that the enlarged object image can be viewed through the eyepiece optical system 30.

Figure 5:
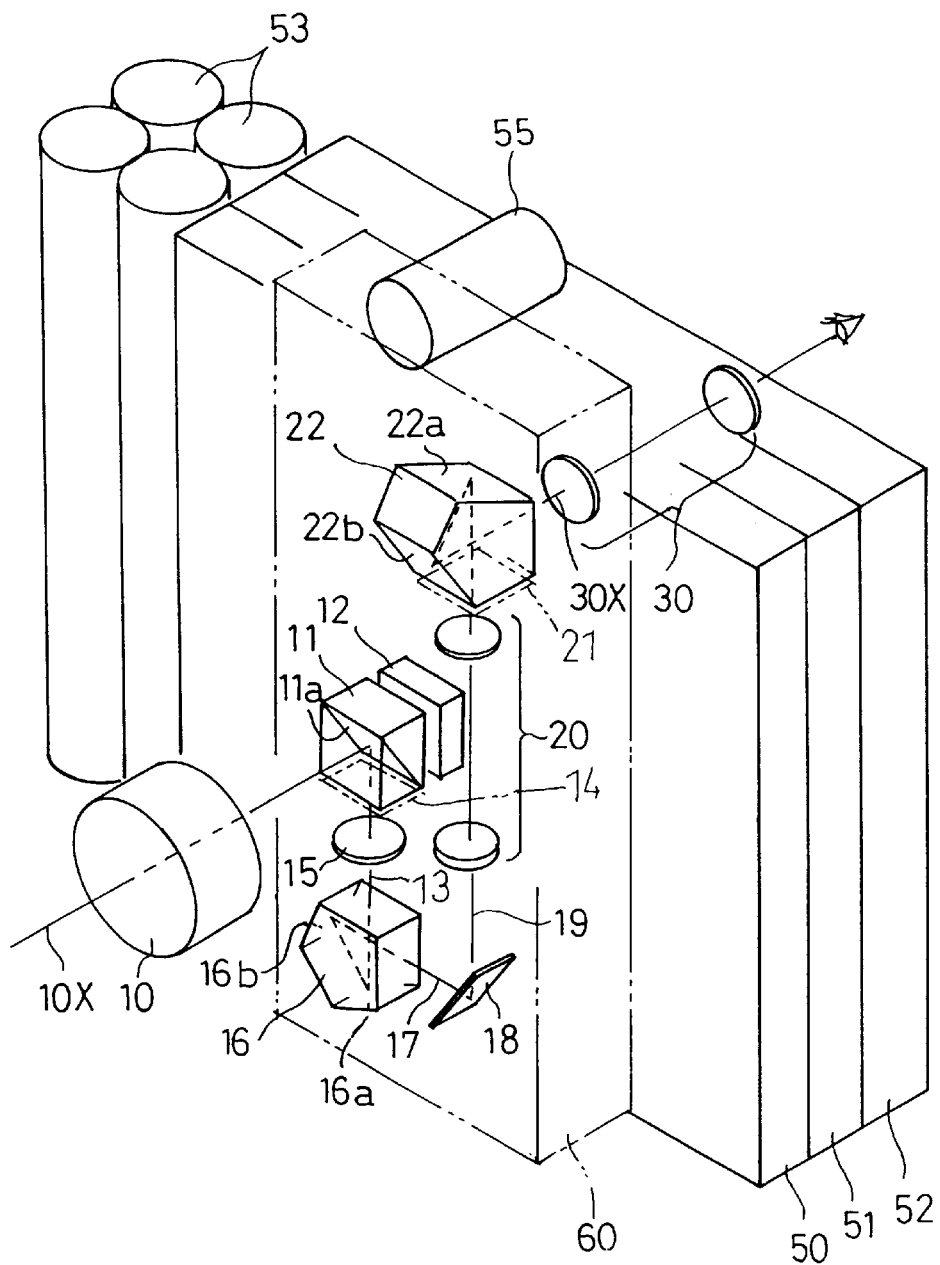
FIG. 5 is a perspective view of a third embodiment of a single lens reflex digital still camera according to the present invention.

FIGS. 5 and 2 show a third embodiment of a digital single lens reflex camera of the present invention. In the third embodiment, the elements corresponding to those in the first or second embodiment illustrated in FIGS. 1, 3 and 4 are designated with the same reference designators; and furthermore, FIG. 2 illustrates a developed view of optical elements for both the first and third embodiments. The object-carrying light transmitted through the photographic optical system 10 reaches the semitransparent member (beam splitter) 11 secured at the viewing position in the photographic light path. The object-carrying light transmitted through the beam splitting surface 11a of the beam splitter 11 is received by the image pickup device 12 located at the imaging plane (focal plane) of the photographic optical system 10. The photographic optical system 10 forms an object image directly on the image pickup surface of the image pickup device 12.

The image pickup device 12 is secured to a rigid substrate 50. The rigid substrate 50 lies in a plane perpendicular to the optical axis of the photographic optical system 10 and is provided thereon with the image pickup device 12 and at least a part of a drive circuit to drive the image pickup device 12. For example, the drive circuit can be made of a transmitter circuit, a timing circuit, an image pickup device driver, or a video signal processing circuit, etc.

In the third embodiment, rigid substrates 51 and 52 are superimposed on the rigid substrate 50. The rigid substrates 51 and 52 are also provided with drive circuits mounted thereon to drive the image pickup device 12. The mounting of the image pickup device 12 on the rigid substrate 50, and the mounting of the drive circuits on the rigid substrates 50 through 52 are carried out in advance, independently of the assembling operation of the camera.

The rigid substrates 50 through 52 are rectangular, and the lateral sides thereof extend along the width of the camera. It is possible to provide a space in which power source batteries 53 can be accommodated, on the side of the rigid substrates 50 through 52.

The eyepiece optical system 30 of the finder optical system is provided in the upper portion of the rigid substrates 50 through 52. A finder block 60 is placed on the front surface of the rigid substrate 50 (substrates 50 through 52). The finder block 60 is integrally provided with the semitransparent member 11 having the beam splitting surface 11a, the condenser lens 15, the pentagonal prism 16, the mirror 18, the relay optical system 20, and the pentagonal prism 22.

The beam splitting surface 11a of the semitransparent member 11 is set so that the object-carrying light (reflection light path 13) is reflected downward by the beam splitting surface 11a in a direction substantially away from an the eyepiece optical system 30, unlike the conventional single lens reflex camera. A primary imaging plane 14 which is optically equivalent to the image pickup surface of the image pickup device 12 is located on the light path of the reflected light (reflection light path) 13. A condenser lens 15 is located in the vicinity of and behind the primary imaging plane 14. A pentagonal prism 16 having two reflection surfaces 16a and 16b and defining a 45 degree angle therebetween is provided as a lower reflector to deflect the reflection light path 13 of the light reflected by the semitransparent member 11 in the lateral direction by 90 degrees. A mirror 18 is provided as a lower reflector to deflect the lateral reflection light path 17 upward by 90 degrees at an approximately vertical direction. The relay optical system 20 is placed in the vertical reflection light path 19 of the light bent by the mirror 18. The pentagonal prism 22 is provided as an upper reflector having two reflection surfaces 22a and 22b which form a 45 degree angle therebetween, located at an intersection between the vertical reflection light path 19 and the optical axis 30X of the eyepiece optical system 30.

The semitransparent member 11, the condenser lens 15, the pentagonal prism 16, the mirror 18, the relay optical system 20, and the pentagonal prism 22 are integrally formed within the finder block 60. The finder block 60 is formed independently of the assembling operation of the camera. It is possible to make the finder eyepiece optical system 30 integral with the finder block 60. If the eyepiece optical system 30 and the finder block 60 are not integral, the adjustment to align the optical axis 30X of the eyepiece optical system 30 placed on the rigid substrates 50 through 52 with the vertical light path 19 of the finder block 60 is carried out in the assembling operation.

In the third embodiment, the eyepiece optical system 30 is deviated from the center of the photographic optical system 10. If the outer appearance of the camera is required to be symmetrical with respect to the center of the photographic optical system 10, a strobe condenser 55, for example, can be located on the photographic optical system at a position symmetrical to the eyepiece optical system 30.

As mentioned above, the object-carrying light is reflected downward by the beam splitting surface 11a of the beam splitter 11 and the reflection light path along which the reflected light travels toward the eyepiece optical system 30 is located within a plane perpendicular to the optical axis 10X of the photographic optical system 10 and therearound. Consequently, a space large enough to accommodate the relay optical system 20 can be easily achieved. Namely, if the number of lens elements of the relay optical system 20 is increased to enhance image quality, the additional lens elements can be easily accommodated. Moreover, the integral formation of the reflection light path and the optical elements therein within the finder block 60 facilitates the assembly thereof.

Note that the object image formed on the primary imaging plane 14 which is optically equivalent to the image pickup surface of the image pickup device 12 is appropriately enlarged and re-formed as a secondary image on the secondary imaging plane 21 by the relay optical system 20, so that the secondary image can be viewed through the eyepiece optical system 30. Namely, the relay optical system 20 and the eyepiece optical system 30 constitute an image magnifying optical system. There are six reflection surfaces, including the beam splitting surface 11a of the beam splitter 11, which are appropriately oriented in the light path from the photographic optical system 10 to the eyepiece optical system 30 to form an erect image to be viewed through the eyepiece optical system 30. In an embodiment illustrated in FIG. 5, the reflection surfaces 16a and 16b of the pentagonal prism 16 can be replaced with mirrors.

Figure 6:
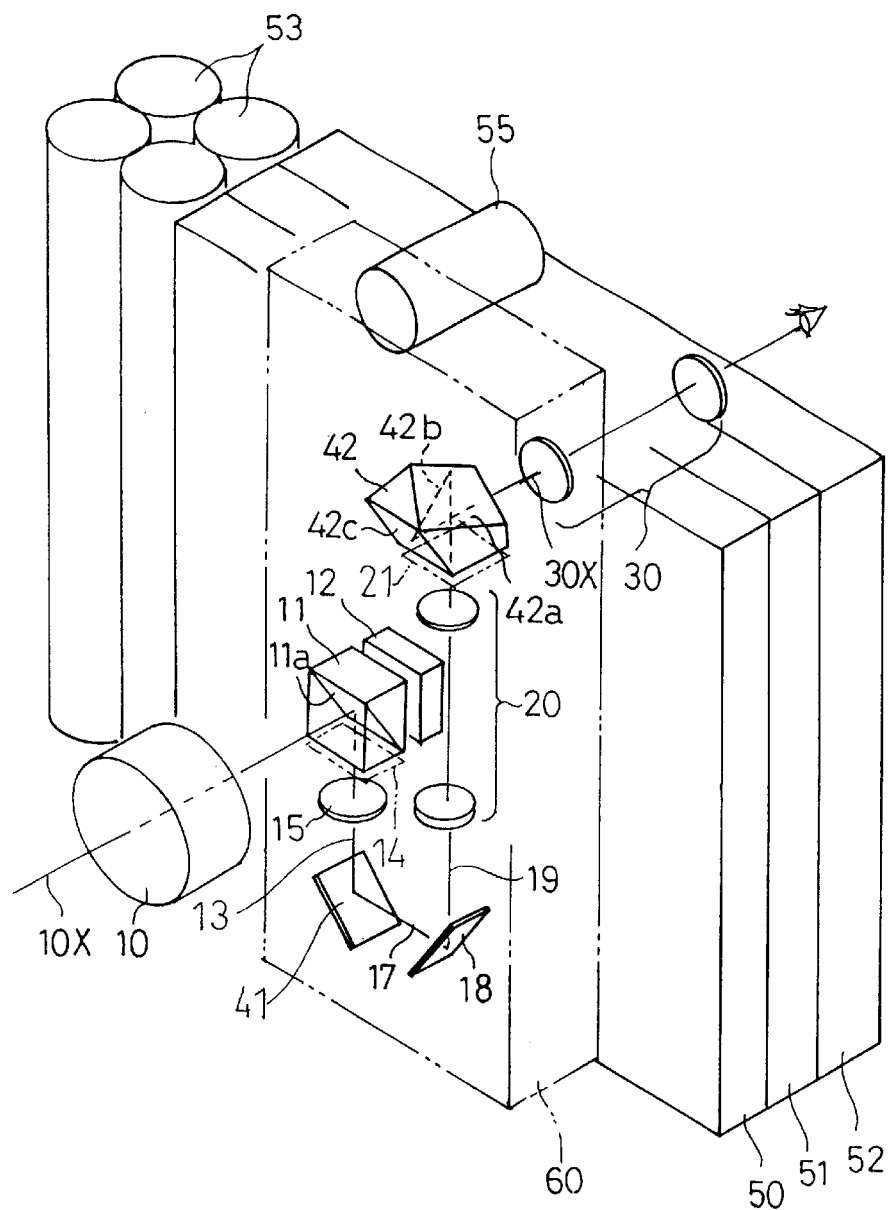
FIG. 6 is a perspective view of a fourth embodiment of a single lens reflex digital still camera according to the present invention.

FIGS. 6 and 4 show a fourth embodiment of the present invention. In the fourth embodiment, the pentagonal prisms 16 and 22 in the third embodiment are replaced with a mirror 41 and a pentagonal roof prism 42, respectively. Note that FIG. 4 illustrates a developed view of optical elements for both the second and fourth embodiments. The pentagonal roof prism 42 is provided with a pair of orthogonal roof reflection surfaces 42a and 42b, and a third reflection surface 42c which forms a 45 degree angle with respect to edge line of the roof reflection surfaces 42a and 42b.

In the fourth embodiment, there are six reflection surfaces in the light path from the photographic optical system 10 to the eyepiece optical system 30 to form an erect image to be viewed through the eyepiece optical system 30. In the fourth embodiment, the semitransparent member 11, the condenser lens 15, the mirror 41, the mirror 18, the relay optical system 20, and the pentagonal roof prism 42 are integrally formed as the finder block 60.

In the fourth embodiment, the object image formed on the primary imaging plane 14 is enlarged and re-formed on the secondary imaging plane 21 by the relay optical system 20, so that the enlarged object image can be viewed through the eyepiece optical system 30, similar to the third embodiment.

As can be understood from the above discussion, according to the present invention, a relay optical system to relay the object image formed on an imaging plane optically equivalent to the image pickup surface of the image pickup device to the eyepiece optical system can be easily incorporated in a digital single lens reflex camera. Moreover, according to the present invention, a simple digital single lens reflex camera having no movable members, which can be easily assembled can be achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A digital single lens reflex camera including a reflector provided in a photographic light path to reflect object-carrying light transmitted through a photographic optical system toward a finder optical system and an image pickup device is located at the imaging plane of said photographic optical system, wherein:

the object-carrying light in the photographic light path is reflected by said reflector in a direction substantially away from an eyepiece optical system of said finder optical system, a reflection light path in the vicinity of the photographic optical system is provided with a plurality of reflection surfaces configured so that the light reflected by the reflector in the photographic light path is incident on the eyepiece optical system; and a relay optical system is disposed in the reflection light path to relay an image formed on a primary imaging plane, which is optically equivalent to an image pickup surface of the image pickup device, to said eyepiece optical system, wherein the reflector is positioned in the photographic light path that transmits object carrying light from the photographic optical system to the image pick-up device.

2. A digital single lens reflex camera according to claim 1, wherein said plurality of reflection surfaces includes at least one of a penta prism, a penta roof-prism, and a mirror.

3. A digital single lens reflex camera according to claim 1, wherein said relay optical system comprises an image magnifying optical system which enlarges and re-forms the image formed on the primary imaging plane.

4. A digital single lens reflex camera according to claim 1, wherein said reflector comprises a beam splitter which partly reflects object-carrying light transmitted through the photographic optical system toward the finder optical system and transmits the remainder of the object-carrying light toward said image pickup device.

5. A digital single lens reflex camera comprising:
a photographic optical system;
a finder optical system having an eyepiece optical system;
a reflector provided in a photographic light path to reflect object-carrying light transmitted through the photographic optical system toward the finder optical system, said reflector being configured to reflect the object-carrying light in a direction substantially away from the position of said eyepiece optical system with respect to an optical axis of the photographic optical system, an image pickup device located at an imaging plane of the photographic optical system;

a reflection light path provided with a plurality of reflection surfaces, said reflection light path being formed in the vicinity of the photographic optical system to make the light reflected by the reflector in the photographic light path incident on the eyepiece optical system; and a relay optical system that is disposed in the reflection light path to relay an image formed on a primary imaging plane, which is optically equivalent to an image pickup surface of the image pickup device, to the eyepiece optical system, wherein the reflector is positioned in the photographic light path that transmits object carrying light from the photographic optical system to the image pick-up device.

6. A digital single lens reflex camera according to claim 5, wherein said plurality of reflection surfaces includes at least one of a penta prism, a penta roof-prism, and a mirror.

7. A digital single lens reflex camera having a semitransparent member which reflects a portion of object-carrying light transmitted through a photographic optical system and permits the remainder of said object-carrying light to pass therethrough toward an image pickup device, comprising:

at least one rigid substrate which lies in a plane substantially perpendicular to the optical axis of the photographic optical system, wherein at least said image pickup device is mounted thereon; and an eyepiece optical system, the optical axis thereof being substantially parallel with the optical axis of the photographic optical system, said eyepiece optical system being provided on one side of said at least one rigid substrate; wherein said semitransparent member partly reflects the object-carrying light transmitted through the photographic optical system in a direction substantially away from said eyepiece optical system; a plurality of reflection surfaces which reflect the light reflected by the semitransparent member toward the eyepiece optical system; and a relay optical system which is disposed in a reflection light path between the semitransparent member and the eyepiece optical system to relay an image, formed on a primary imaging plane which is optically equivalent to an image pickup surface of the image pickup device, to an eyepiece optical system; are integrally formed as a finder block;

said finder block being provided on the surface of said rigid substrate which is adjacent to the photographic optical system.

8. A digital single lens reflex camera according to claim 7, wherein said plurality of reflection surfaces includes at least one of a penta prism, a penta roof-prism, and a mirror.

9. A digital single lens reflex camera according to claim 7, wherein the rigid substrate is provided with a first substrate on which the image pickup device is mounted and at least another substrate superimposed thereon.

10. A digital single lens reflex camera according to claim 7, wherein the relay optical system constitutes an image magnifying optical system which enlarges and re-forms the image formed on the primary imaging plane.

11. A digital single lens reflex camera according to claim 7, wherein the finder block is integrally provided with the eyepiece optical system of the finder optical system and is provided in the upper portion of said rigid substrate.

12. A digital single lens reflex camera comprising:

a photographic optical system;

a finder optical system having an eyepiece optical system;

an image pickup device located at an imaging plane of the photographic optical system;

a semitransparent member which reflects a portion of object-carrying light transmitted through the photographic optical system and permits the remainder of said object-carrying light to pass therethrough toward the image pickup device, said semitransparent member being arranged to reflect the object-carrying light in a direction substantially away, from the position of said eyepiece optical system and with respect to the optical axis of the photographic optical system;

a reflection light path provided with a plurality of reflection surfaces, said reflection light path being formed in the vicinity of the photographic optical system to make the light reflected by the reflector in the photographic light path incident on the eyepiece optical system;

a relay optical system that is disposed in the reflection light path to relay an image formed on a primary imaging plane, which is optically equivalent to an image pickup surface of the image pickup device, to the eyepiece optical system;

at least one rigid substrate on which at least the image pickup device is mounted, said rigid plate lying in a plane substantially perpendicular to the optical axis of the photographic optical system; and a finder block that integrally forms said semitransparent member, a plurality of said reflection surfaces and said relay optical system; said finder block being disposed on the surface of the rigid substrate located adjacent to the photographic optical system.

13. A digital single lens reflex camera according to claim 12, wherein said plurality of reflection surfaces includes at least one of a penta prism, a penta roof-prism, and a mirror.

14. A digital single lens reflex camera according to claim 12, wherein said eyepiece optical system is arranged so that an optical axis thereof is substantially parallel with the optical axis of the photographic optical system and is provided on one side of said rigid substrate.

15. The digital single lex reflex camera according to claim 1, reflecting surface of said reflector positioned between the photographic optical system and the image pick-up device, reflects object carrying light in the direction substantially away from an eyepiece optical system of the finder optical system.

16. The digital single lex reflex camera according to claim 5, reflecting surface of said reflector, positioned between said photographic optical system and said image pick-up device, reflects object carrying light in a direction substantially away from said eyepiece optical system.

* * * * *